US008805936B2

(12) United States Patent
Chen et al.

(10) Patent No.: US 8,805,936 B2
(45) Date of Patent: Aug. 12, 2014

(54) EMAIL SERVER COOPERATIVE MANAGEMENT FOR AUTOMATIC ROUTING OF EMAILS BASED ON PREFERENCES

(75) Inventors: Yen-Fu Chen, Austin, TX (US); Fabian F. Morgan, Austin, TX (US); Keith R. Walker, Austin, TX (US); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 12/104,225

(22) Filed: Apr. 16, 2008

(65) Prior Publication Data

US 2009/0265435 A1  Oct. 22, 2009

(51) Int. Cl.
*G06F 15/16* (2006.01)
(52) U.S. Cl.
USPC ........... 709/206; 709/201; 709/202; 709/203; 709/217
(58) Field of Classification Search
USPC .......................... 709/206, 201, 202, 203, 217
See application file for complete search history.

(56) References Cited

U.S. PATENT DOCUMENTS

| 5,923,845 | A | 7/1999 | Kamiya et al. | |
|---|---|---|---|---|
| 6,725,269 | B1 | 4/2004 | Megiddo | |
| 6,871,215 | B2 | 3/2005 | Smith et al. | |
| 6,895,427 | B2 * | 5/2005 | Quine et al. | 709/206 |
| 6,928,465 | B2 | 8/2005 | Earnest | |
| 6,941,454 | B1 * | 9/2005 | Spraggs | 713/150 |
| 6,965,918 | B1 | 11/2005 | Arnold et al. | |
| 2003/0023695 | A1 * | 1/2003 | Kobata et al. | 709/206 |
| 2004/0005040 | A1 * | 1/2004 | Owens et al. | 379/93.24 |
| 2004/0064734 | A1 * | 4/2004 | Ehrlich | 713/201 |
| 2004/0117450 | A1 | 6/2004 | Campbell et al. | |
| 2005/0044153 | A1 * | 2/2005 | Gross | 709/206 |
| 2005/0114453 | A1 * | 5/2005 | Hardt | 709/206 |
| 2005/0233794 | A1 * | 10/2005 | Cannon et al. | 463/16 |
| 2006/0101119 | A1 | 5/2006 | Qureshi et al. | |

(Continued)

FOREIGN PATENT DOCUMENTS

WO  WO 9832273 A1 * 7/1998 ............. H04M 3/50

OTHER PUBLICATIONS

Belcher, Herman A., AUS920070288US1 (4242)—Non-Final Office Action: mail date Aug. 14, 2009; published by the USPTO in utility U.S. Appl. No. 11/874,758, pp. 11.

(Continued)

*Primary Examiner* — Lan-Dai T Truong
(74) *Attorney, Agent, or Firm* — Garg Law Firm, PLLC; Rakesh Garg; Mark C. Vallone

(57) ABSTRACT

Methods, systems, and media are disclosed for managing the routing of an email at the server level to an email client by preferences set in a routing application located on the server. One embodiment includes querying, by a routing application located on a server and associated with an email system, the email by comparison to conditions for each preference set in the routing application, wherein a preference comprises a routing action. Further, the method includes identifying, based on the querying and by the routing application, a match between the email and at least one of the conditions. Further still, the method includes performing, based on the match and by the routing application, the preference associated with the at least one of the conditions of the email, whereby the email is transmitted to an email client.

14 Claims, 4 Drawing Sheets

(56) References Cited

U.S. PATENT DOCUMENTS

| | | | |
|---|---|---|---|
| 2007/0016647 A1* | 1/2007 | Gupta et al. | 709/206 |
| 2008/0065779 A1* | 3/2008 | Isaac et al. | 709/230 |
| 2008/0127233 A1* | 5/2008 | Neil et al. | 719/330 |
| 2008/0246605 A1* | 10/2008 | Pfeffer et al. | 340/540 |
| 2009/0006548 A1* | 1/2009 | Ramanathan et al. | 709/204 |

OTHER PUBLICATIONS

Belcher, Herman A., AUS920070288US1 (4242)—Final Office Action: mail date Dec. 29, 2009; published by the USPTO in utility U.S. Appl. No. 11/874,758, pp. 17.

* cited by examiner

EMAIL SERVER COOPERATIVE MANAGEMENT FOR AUTOMATIC ROUTING OF EMAILS BASED ON PREFERENCES

FIELD OF INVENTION

The invention generally relates to devices, methods, and media for routing email to an email client of an email system, wherein the routing occurs through a routing application located on a server and in communication with the email system, based on conditions established by preferences set in the routing application. As a result, an email recipient has control of their email account destinations for incoming emails independent of the email sender.

BACKGROUND

Electronic mail ("email") is an electronic message, which a person may type at a computer system, such as a personal digital assistant ("PDA") or conventional computer, and then transmit the email over a computer network to another person. For a user to type an email, the computer system includes an email client ("client"), which is an application used to read, write and send email. In simple terms, the client, such as in Lotus Notes®, Outlook®, Gmail®, Eudora®, or AOL®, is the user interface for an email system.

Typically, the email client includes a simple text editor, an address book, a filing cabinet and a communications module. The text editor allows the user to compose a text message for an email, and usually includes spell and grammar checking as well as formatting facilities. The text editor may also include the ability to append attachments to an email such as files, documents, executable programs, schematics, etc. The address book stores commonly used email addresses in a convenient format to reduce the chance of email address errors. The filing cabinet stores email messages, both sent and received, and usually includes a search function for easy retrieval of a desired email or email attachment. The communications module deals with transport to and from the email client over a computer network to a mail server, the application that receives an email from email clients and/or other mail servers.

As is commonplace, especially with today's intermingling of personal and professional lives, many people have more than one email account from which to send and receive emails, For instance, oftentimes, the same person has an email account through work, through an internet service provider, e.g., AOL® and Earthlink®, and through free web-based providers, e.g., Gmail® by Google® and Hotmail® by MSN®. Whether purposefully or accidentally, the same person will give out, say, a personal email address to a colleague and a work email address to a friend, and others will collect both personal and work emails for the same person through email forwards and the like; as a result, one can end up with multiple email addresses for the same person/contact and not even know it. Furthermore, when a person sends the same email to multiple email accounts belonging to the same person, or, a person receives through an email client receiving email from the same person's multiple email accounts, unnecessary bandwidth use and traffic may occur as described below. Accordingly, users of an email system may want to choose where these incoming emails are routed based on a variety of set parameters so that the incoming email is routed to where the intended recipient wishes to receive them or not.

A computer network, such as one belonging to a business organization, consists of a number of computer systems interconnected with links for transmission of data between the computer systems, which serve as conduits to send an email to a recipient. In addition to handling email traffic, with or without email attachments, it is noteworthy to point out that these computer systems also handle the everyday rigors of ah organization's use, including, for example, storing and retrieving documents, running multiple applications and operating systems, and so forth. The physical design of each link limits the bandwidth for the link. Bandwidth refers to the amount of data that can be transmitted in a fixed amount of time. The topology of the network, i.e., the organization, number, and interconnection between links of the network, can be designed to increase bandwidth between different points on the network by providing parallel links. Therefore, design of the bandwidth and topology for these networks must take into consideration all traffic, finding a balance between the costs involved with increasing bandwidths of links and the slowdowns when the bandwidths are less than the peak traffic requirements.

Compromising the network's capacity more so is the handling of email traffic when the emails include email attachments. Email attachments can cause the traffic bandwidth requirements to peak, slowing down the network for everyday operations, For example, a user may draft a text email, which is about 20 kilobytes, and transmit the email to ten people. As a result, the mail server introduces 200 kilobytes of data to the network when the mail server generates a copy of the email for each of the ten recipients. Even small networks are likely able to handle 200 kilobytes without any noticeable slowdowns. However, the user may decide to transmit a drawing, which may be somewhere between 2 megabytes and 20 megabytes, along with the text of the email to enhance the communication. Now, the mail server copies not only the email, but also the email attachment and introduces between 22 megabytes and 202 megabytes of data traffic at substantially the same time, peaking the load, at least in certain links, of even large networks. This makes the network run slower for other users. Possibly even more troublesome, however, is from the employer's perspective: multiple emails to the same person may decrease a worker's productivity because the same person is expending time reading the same email sent to another email account for the same person, and may require the employer to procure more storage hardware of services. Furthermore, a worker may be receiving emails at work that are better suited for routing to their personal email account and handled on their personal time, as opposed to company time so as to defray wasting company time and resources.

Some solutions attempt to alleviate email traffic congestion by "throwing more money at the problem." That is, to solve the congestion problem by increasing the size of the network by: increasing the network's bandwidth. In order to display, store, and retrieve data, the network must have computer systems such as dedicated mail servers of sufficient size to accommodate the data traffic requirements. Therefore, increasing a network's bandwidth necessarily requires an organization to make greater expenditures or institute restrictions on use of the network's computer systems to keep pace with the increased demands.

Further, the purchase of additional hardware components necessarily increases the mail server administrator's involvement in handling the ever-increasing email traffic over an organization's network, resulting in greater administrative costs. These types of solutions, however, are piecemeal solutions that will forever require greater expenditures, or restrictions as an organization grows. In short, these solutions are not solutions; they are patches for network problems.

Some solutions attempt to put into place client-based auto-forward rules. For example, if a User realizes that a family member tends to send email to the user's corporate email account despite requests to the contrary, the user can establish a rule in their email client to forward emails from the family member to the user's personal email account. However, this approach does not work well in situations where the email included a distribution list, and so replies to all will then be sent to the corporate email account. Furthermore, this solution requires at least double the bandwidth requirements on the corporate email server, namely, once on the incoming email and again when forwarded outbound. Furthermore, this solution can result in untimely receipt by the user, such as if the family member sent important information during non-working hours when the user may have had their corporate email client closed.

A need, therefore, exists for devices, methods and media to attenuate the foregoing problems by email systems being able to route incoming emails based on set preferences, which, when detected arise in a condition that dictates where an incoming email is to be routed before the email reaches the email client of an email system.

SUMMARY OF THE INVENTION

Embodiments of the invention generally provide methods, systems, and media for managing the routing of an email at the server level to an email client by preferences set in a routing application located on the server. One embodiment includes querying, by a routing application located on a server and associated with an email system, the email by comparison to conditions for each preference set in the routing application, wherein a preference comprises a routing action. Further, the method includes identifying, based on the querying and by the routing application, a match between the email and at least one of the conditions. Further still, the method includes performing, based on the match and by the routing application, the preference associated with the at least one of the conditions of the email, whereby the email is transmitted to an email client of the same or another email system, wherein the another system is a cooperating email system.

In another embodiment, the invention provides a system for managing the routing of email at the server level by preferences set in a routing application located on the server. The system includes an interrogation module for querying, by a routing application located on a server and associated with an email system, the email by comparison to conditions for each preference set in the routing application, wherein a preference comprises a routing action. Further, the system includes an identification module for identifying, based on the querying and by the routing application, a match between the email and at least one of the conditions. Further still, the system includes a performance module for performing, based on the match and by the routing application, the preference associated with the at least one of the conditions of the email, whereby, the email is transmitted to an email client of the same or another email system, wherein the another system is a cooperating email system.

In yet another embodiment, the invention provides a machine-accessible storage medium containing instructions for managing the routing of email at the server level, whereby when the instructions are executed by a machine, they cause the machine to perform operations. The instructions generally include operations for querying, by a routing application located on a server and associated, with an email system, the email by comparison to conditions for each preference set in the routing application, wherein a preference comprises a routing action. The instructions further include operations for identifying, based on the querying and by the routing application, a match between the email and at least one of the conditions. Further still, the instructions include operations for performing, based on the match and by the routing application, the preference associated with the at least one of the conditions of the email, whereby the email is transmitted to an email client of the same or another email system, wherein the another system is a cooperating email system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE EMBODIMENTS

The following is a detailed description of example embodiments of the invention depicted in the accompanying drawings. The embodiments are examples and are in such detail as to clearly communicate the invention. However, the amount of detail offered is not intended to limit the anticipated variations of embodiments, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, devices, methods, and media for routing email by a routing application located on a server and in communication with an email system before the incoming email reaches the email client of the email system are contemplated. Embodiments include querying, by a routing application located on a server and associated with an email system, the email by comparison to conditions for each preference set in the routing application, wherein the preference comprises a routing action. Before the routing application can perform any routing action, the application's preferences must be set, and may be set, for example, by an administrator, a user having access privileges, or come with default settings. The preferences may, for instance, permit a routing action based on the sender/receiver of an email in an email distribution list, domain name/ISP of the email, subject, content and any header/metadata information for the email, classification of the email, or any combination thereof. The server in communication with the email system, whether, for instance, merely a gateway server of an email system or more than one server located on cooperating email systems, initiates an identification process, based on the querying and by the routing application, to see if the comparisons of the set conditions to the email results in any matches between the email and at least one of the conditions set in the routing application. As an aside, for the cooperating email systems embodiments, then the routing application on one server, for example, may send, via SMTP to connect and authorize, management instructions to another server in communication with another email system to form a trusted account, whereby the routing preferences may be achieved for the email based on a match to conditions found in the email. If there is a match, then the routing application performs the set preference associated with the at least one of the conditions found in the email, whereby the email is transmitted to an email client of the email system. Notably, this routing is achieved before the email reaches the email client of the email system. Advantageously, embodiments of the present invention reduce or attenuate instantaneous data traffic on a computer system's network by reducing the number of emails, attachments thereto, and spam.

Figure 1:
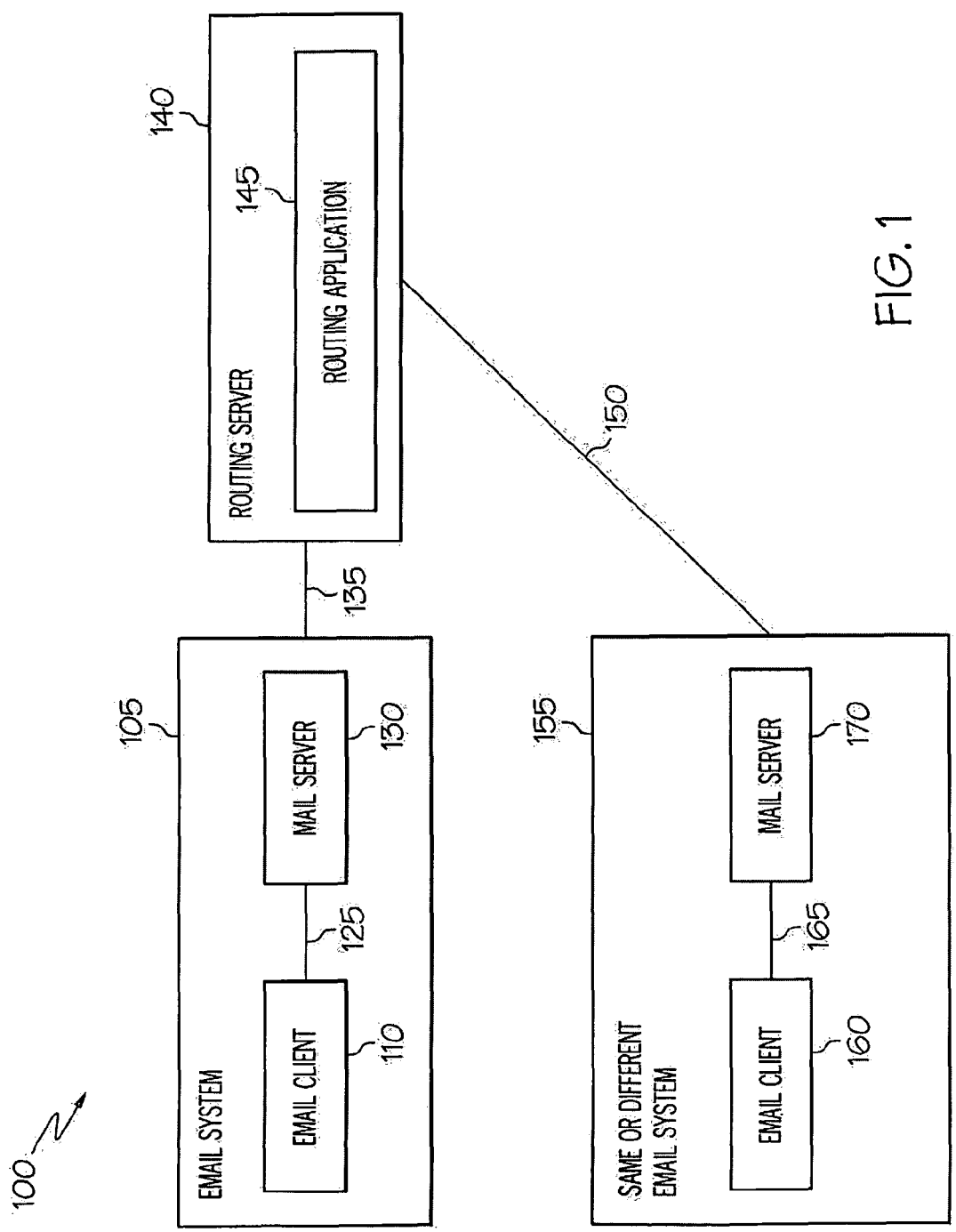
FIG. 1 depicts an example embodiment of a system including an email client associated with a computer system in communication with a mail server for permitting the management of routing of an email by a routing application located on a server and in communication with one or more cooperating email systems of the same or a different type in accordance with the disclosed invention.

Turning now to the drawings, FIG. 1 depicts an embodiment of a system 100 for managing the routing an email. The system 100 includes a non-depicted computer system, such as a conventional computer, networked computer system, PDA, or cell phone, in integral or networked communication with an email system 105 having an email client ("client") 110 in communication with a mail server 130. The computer system includes a client 110 for the user to compose, send and receive emails over wired or wireless communication 125 with a mail server 130 from/to at least another email client 160 on the same (as computer system 105) or a different computer system 155 that is in wired or wireless communication with its mail server 170. Computer systems normally include non-depicted peripherals, such as a keyboard and a mouse, as well as non-depicted components including a microprocessors, memory, printers, CD-ROM devices, wires, antennas, IR wireless components, Bluetooth® components, and/or modems to connect 125, 135 to one or more mail servers 130, 170 and/or to connect 135 to other applications 140 and computer systems. The email client 110, 160, itself, is a software application, such as Lotus Notes®, Outlook Express™, Netscape® Messenger™, Microsoft® Outlook®, Entourage X™, and Eudora®. A client 110, 160 usually includes an intuitive, graphical user interface ("GUI") and a simple text editor that allows the user to create an email by opening a new message window and typing a text message via peripherals associated with the email systems 105, 155. In addition, a client 110, 160 normally includes simple spell checking and formatting facilities, as well as facilities to attach and detach email attachments to an email to be sent.

In system 100, the email system 105 is in wired or wireless connection 135 with a server 140 routing having a routing application 145. Located on a routing server 140, such as a gateway server, the routing application 145 analyzes incoming or outgoing email to ensure that routing occurs in conformity with preferences set in the routing application 145. Whether set by a user, administrator, operator, or factory-set, the preferences are routing actions that are to occur for an incoming or outgoing email on which the routing application 145 acts. The routing actions occur based on a match occurring between the scrutinized email, whether incoming or outgoing, and the set preferences. For instance, the preferences may permit a routing action based on the sender/receiver of an email in an email distribution list, domain name/ISP of the email, subject, content and any header/metadata information for the email, classification of the email, or any combination thereof. So, by further example, say there is a preference set for "@ibm" in the from field incoming emails to be sent to bob@ibm.com. If the routing application 145 on the routing server 140 sees an incoming email having "@ibm" in the from field, then the routing application 145 will pass such an incoming email to the mail server 130 of the email system 105 so that it may then be passed to the email client 110 for the recipient to see and read such email. In this manner and in sum, the routing application analyzes the email for a match by comparing set preferences to parts of an email, and if a match is identified, then the routing action occurs as directed therein, i.e., transmitting the email to an email client in communication 135, 150 with the same 105 or a different email system 155, wherein the different email system is a cooperating email system, for example, having the system 100 with the routing application 145 located on a routing server 140 between them 105, 155 or having a trusted account between them 105, 155, whereby management instructions are passed from the routing application 145 to the different email system 155 so that its 155 mail server 170 in communication with email client 160 may utilize the routing application 145 for incoming and outgoing emails between the at least two email systems 105, 155 that are cooperating.

Figure 2:
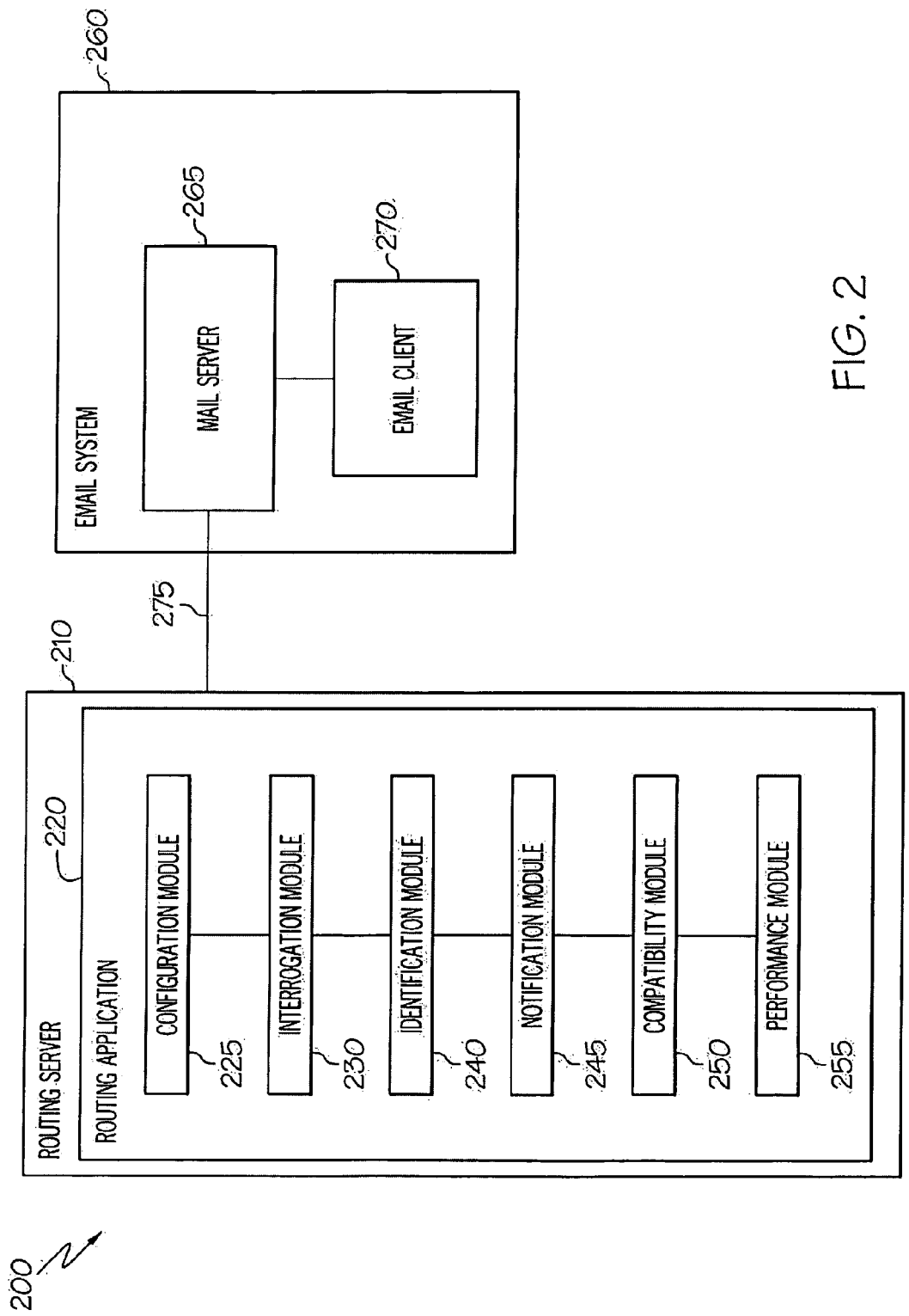
FIG. 2 depicts an example embodiment of a system for managing the routing of an email by a routing application located on a server and in communication with an email system in accordance with the disclosed invention.

Now, moving to FIG. 2, a more detailed discussion of a system 200 for managing the routing of email ensues by disclosing components associated with and/or integrated into the routing application 220, or 145 of FIG. 1, found on a routing server 210 or a multitude of servers and/or accessible as a web service via communication 275 to an email system 260 and/or non-depicted, but cooperating email systems. System 200 depicts an email system 260, mail server 265 and email client 270 in wired or wireless communication 275 with a local, remote, or hosts of server(s) 220 having a routing application 220 thereon. Although depicted separately for clarity, the software and/or hardware logic of the routing application 220 resides on the server side on one or more routing server(s) 210 and may, for instance, be integrated into a single application 220 that may be stored on a dedicated server, or it 220 may be a web service, wherein the various functionalities of the application are spread among one or many routing server(s) 210.

Before utilization of the routing application 220 to result in final routing of an email, the routing application 220 includes a configuration module 225 for selecting the preferences, i.e., setting the preferences for email routing. The preferences comprise a host of conditions that tell the routing application 220 what conditions to look for in emails so that the routing application knows how the user, operator, administrator, default setter or other person wants emails to be routed if certain conditions, exist in emails. The configuring may occur through enabling logic, reduced to hardware and/or software, to allow the user, through prompts, drop-down menus, radio button, check boxes, and so forth to set the preferences. The preferences, themselves, are what the routing application's 220 interrogation module 230 will use to analyze the email as comparisons to parts of the email under analysis before any routing occurs. The preferences may include the sender/receiver of an email in an email distribution list, domain name/ ISP of the email, subject, content and any header/metadata information for the email, classification of the email, a free search on parts of the email, or any combination thereof. Here, the selectable preferences are only limited to the choices allowed to a user to select, and, therefore, are essentially limited only by the enabling logic choices for setting what kind of preferences are possible by a user. The preferences may even be relatively complex in configuration such as with regular expression filters and nested conditions.

Once configured, the system's 200 routing application's 220 interrogation module 230 begins querying an email before any routing of the email occurs. Through enabling logic reduced to software and/or hardware, the interrogation module 230 compares the preferences, which may be configured as discussed above, to parts of the email. If there is a match between a preference to a part of the email, such as a preference set for expletives found in an email, found by the routing application's 220 identification module 240, then its 240 enabling logic will automatically pass the match to the performance module 255 to perform the routing action in accordance with the associated preference. For instance, using the expletive example, if an expletive is the condition found in ah email, and the associated preference's configuration says that the intended email recipient wants such an email to be sent to a different, specified, personal email account, then the performance module 255, through enabling logic found in software and/or hardware, will automatically attempt to send that email found on the routing server 210 to that specified personal email account and prevent that email from ever reaching the mail server 265 of the email system 260 that would otherwise receive the email to which it was addressed. If that different, specified email account is on a cooperating, but non-depicted email system as discussed in previous paragraphs herein, then the email will reach the different, specified email account, otherwise, for example, the email may either never reach the different, specified email account, bounce back to the sender, be deleted, or the routing application 220 may employ further enabling logic found in the notification module 245, which is associated with the identification module 240, to prompt the user/intended email recipient of the email for whether to route the email to the mail server 265 to the email client 270 or to route or not route that email otherwise. As such, the optional notification module 245 overrides or acts in place of the automatic routing performed by the performance module 255, whereby the performance module 255 then acts in accordance with the notification module's 245 stated instructions, which may be entered by a user through text boxes, drop-down menus, radio button, Check boxes, and so forth.

In the instance of cooperating email systems, the system's 200 routing application's 220 compatibility module 250 provides a means for a verified connection with another server or servers associated with another email system to receive and abide by management instructions for utilization of the routing application's 220 other modules 225, 230, 240, 245, and 255. The management instructions from the compatibility module 250 sent and received by another email system's mail server, for instance, allows that another email system to utilize the routing application's 220 functionalities, which are located on one or more remote or distant server(s) and also associated with routing server 210, which is in communication with email system 260. In this manner, the routing application's 220 preferences are followed when there is a match found for incoming or outgoing email on such cooperating email systems because both email systems have access to the routing application 220, which may simply be a web service accessible through the one or more communicating server(s) in communication with both email systems. Of course, this example only speaks of "both email systems", but the same foregoing utilization of the routing application is possible if there are three, four or more cooperating email systems that receive and agree to abide by the management instructions for utilizing the routing application 220; otherwise, such email systems are said to not be "cooperating," and any routing actions required by the routing application 220 based on any identified matches by the identification module 240 will not be performed by the performance module 255 on those "non-cooperating" email systems.

Figure 3:
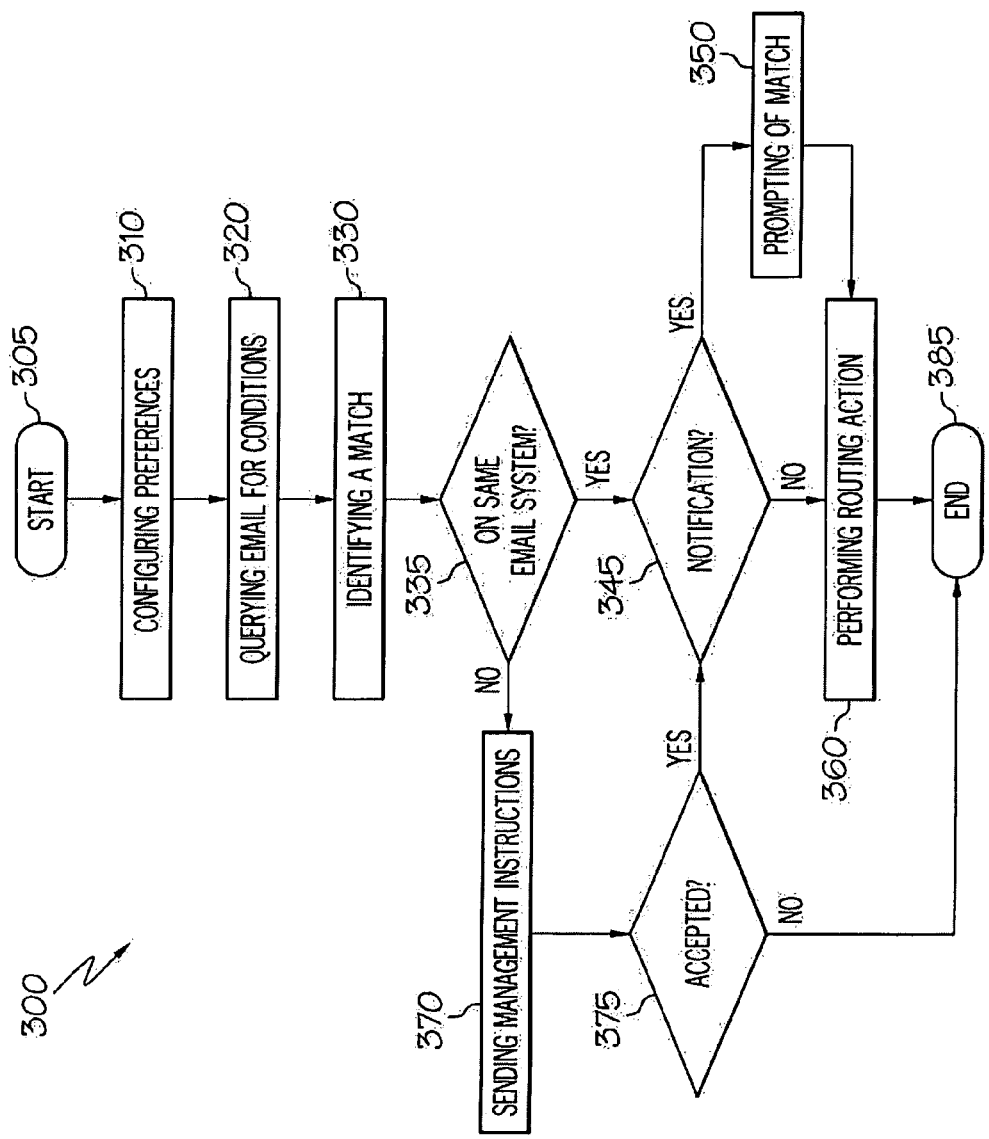
FIG. 3 depicts an example embodiment of a method for the routing of an email by a routing application located on a server and in communication with an email system in accordance with the disclosed invention.

Turning now to FIG. 3, another aspect of the invention is disclosed. In particular, an embodiment of a flowchart 300 for managing the routing of an email is depicted. Flowchart 300 is for a system, such as systems 100 and 200, as shown in FIG. 1 and FIG. 2, respectively.

Flowchart 300 starts 305 by a user, administrator, or application developer configuring 310 preferences of a routing application through, for instance, an associated GUI for the final routing of email based on conditions found under analysis of email that render a match to conditions defined in the configured 310 preferences. The configuring 310 preferences occurs by a user, administrator, or application developer selecting, through enabling logic, reduced to hardware and/or software, preferences through prompts, drop-down menus, radio button, check boxes, and so forth to set the preferences. Once the optional configuring is set for each user on the email system(s) in cooperative communication, via hard wired or wirelessly, with the routing application located on a server(s), then the routing application's utility may be realized in terms of the final routing of email.

After optional configuring 310, the routing application queries 320 an email for conditions found in the email by analyzing it and comparing the same to set preferences. Enabling logic association with the routing application is responsible for running simple to complex algorithms that analyze and compare the email to parts of the email, which may result in the identifying 330 of a match. For instance, a preference for a condition of a queried 320 email stating that all emails denominated as "high importance" be routed to an email client of the associated email system would result in a match between the preference and the condition of the queried 320 email, and such would be routed by the routing application as previously discussed and more so discussed below. Upon the identifying 330 of a match, then flowchart 300 posits whether the email is associated with and on the same email system 335 that is in communication with the server(s) hosting the routing application or another email system. If the email is on the same email system 335, then the flowchart 300 provides that the routing application may optionally allow notification 345 to the user of the identified 330 match. If there is no notification 345, then the routing application performs 360 the routing action associated, i.e., as configured, with the preference, whereby the email is transmitted to the email client on the same or a different, but cooperating, email system. If there is a notification 345, however, then the routing application prompts 350 the user, such as by a message box allowing for optional textual input or select choices, to override or allow the otherwise automatic routing of the email according to the preferences by the routing application performing 360 the routing action. In either of the foregoing two cases, the flowchart ends 385 after the performing 360 of the routing action.

If the email, however, is not on the same email system 335, then the routing application, located oh a server in communication with the email system, sends 370 management instructions to another email system in hopes that the another email system will cooperate with the email system in communication with the server having the routing application. The management instructions are sent, such as by SMTP, to form a trusted connection between the server having the routing application and the email for transmitting to the another email system. The management instructions, themselves, are logic that enable the another email system to receive and utilize the routing application's functionalities as described herein for the desired routing in conformity with the identified 330 match based oh the querying 320 after the configuring 310. If the management instructions are accepted 375, then the flowchart 300 shows the another email system proceeding to the optional notification 345 and allowing the routing application, whether by sharing the routing application on the server(s) hosting the routing application or by instantiating the routing application on one or more servers, to perform 360 the routing action based on the identified 330 match based on the querying 320 after the configuring 310, and then ending 385. If the management instructions, however, are not accepted 375, then the another email system is not a cooperating email system, and the flowchart ends 385 without the email being transmitted in conformity with the identified 330 match based on the querying 320 after the configuring 310. Here, for instance, the email may simply be deleted or bounce back to the sender without the email reaching the email client of the intended recipient.

Figure 4:
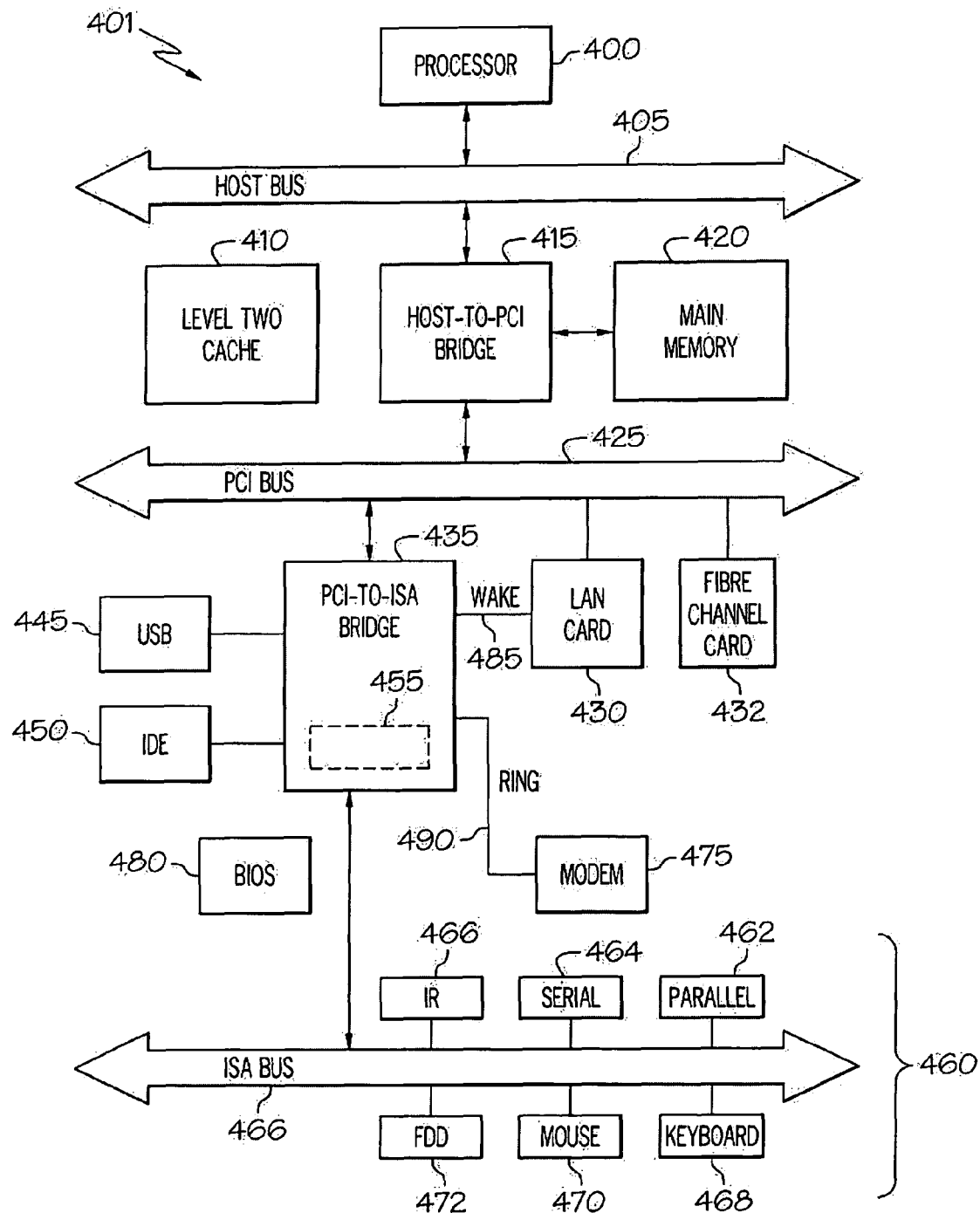
FIG. 4 depicts a computer system capable of being a networked computer system or computer system connected to the networked computer system as discussed, in this disclosure, when provided with the appropriate messaging service software, for use in managing the routing of email.

FIG. 4 illustrates information handling system 401 which is a simplified example of a computer system, in communication with or having integrally contained therein an email system, capable of performing the operations described herein. Computer system 401 includes processor 400 which is coupled to host bus 405. A level two (L2) cache memory 410 is also coupled to the host bus 405. Host-to-PCI bridge 415 is coupled to main memory 420, includes cache memory and main memory control functions, and provides bus control to handle transfers among PCI bus 425, processor 400, L2 cache 410, main memory 420, and host bus 405. PCI bus 425 provides an interface for a variety of devices including, for example, LAN card 430. PCI-to-ISA bridge 435 provides bus control to handle transfers between PCI bus 425 and ISA bus 440, universal serial bus (USB) functionality 445, IDE device functionality 450, power management functionality 455, and can include other functional element's not shown, such as a real-time clock (RTC), DMA control, interrupt support, and system management bus support. Peripheral devices and input/output (I/O) devices can be attached to various interfaces 460 (e.g., parallel interface 462, serial interface 464, infrared (IR) interface 466, keyboard interface 468, mouse interface 470; fixed disk (HDD) 472, removable storage device 474) coupled to ISA bus 440. Alternatively, many I/O devices can be accommodated by a super I/O controller (not shown) attached to ISA bus 440.

BIOS 480 is coupled to ISA bus 440, and incorporates the necessary processor executable code for a variety of low-level system functions and system boot functions. BIOS 480 can be stored in any computer-readable storage medium, including magnetic storage media, optical storage media, flash memory, random access memory, read only memory, and so forth. In order to attach computer system 401 to another computer system to copy files over a network, LAN card 430 is coupled to PCI bus 425 and to PCI-to-ISA bridge 435. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the invention described herein, this computer system is simply one example of a computer system. Those skilled in the art will appreciate that many other computer system designs are capable of performing the invention described herein.

Another embodiment of the invention is implemented as a program product for use within a device such as, for example, devices 100 and 200 shown in FIG. 1 and FIG. 2. The program(s) of the program product defines functions of the embodiments (including the methods described herein) and can be contained on a variety of data-bearing media. Illustrative data-bearing media include, but are not limited to: (i) information permanently stored on non-writable storage-type accessible media (e.g., read-only memory devices within a computer such as CD-ROM disks readable by a CD-ROM drive); (ii) alterable information stored on writable storage-type accessible media (e.g., floppy disks within a diskette drive or hard-disk drive); and (iii) information conveyed to a computer by a communications medium, such as through a computer or telephone network, including wireless communications. The latter embodiment specifically includes information downloaded onto either permanent or even sheer momentary storage-type accessible media from the World Wide Web, an internet, and/or other networks. Such data-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to Use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method for managing routing of an email, the method comprising:
a server computer receiving the email in an application that is in communication with an email system and that analyzes incoming and outgoing emails to ensure that routing of the incoming and outgoing emails occurs in conformity with a plurality of preferences configured in the application, the email including a first email address from multiple email addresses of an addressee of the email, wherein the email is deliverable to the addressee from the email system, and wherein each of the preferences comprises an action for routing emails to at least one of the multiple email addresses of the addressee;
the server computer comparing a part of the email to first and second preferences in the plurality of preferences, wherein the first preference comprises an email address of a sender of the email, and wherein the second preference comprises a regular expression to compare to a content of the email, wherein the content is distinct from the email address of the sender of the email;

the server computer identifying a match between the part of the email and one of the first and the second preferences;

the server computer performing the action of the one of the first and the second preferences, wherein the performing comprises the server computer sending the email to a second email address from the multiple email addresses, wherein the action of the first preference depends on the email address of the sender of the email, wherein the action of the second preference depends on the regular expression matching a portion of a content of the email, and wherein the second email address is different than the first email address; and the server computer allowing, over a verified connection, a second email system access to the application, wherein the email system and the second email system are operable to agree to use the application to analyze a second email sent to the addressee, wherein the email system and the second email system execute on separate data processing systems, and wherein the separate data processing systems are further distinct from the server computer.

2. The method of claim 1, further comprising the server computer providing management instructions to another server computer of another email system in communication with the email system, wherein the management instructions permit invoking the method on the another server.

3. The method of claim 1, further comprising:
the server computer notifying a sender of the email of a preferred email address among the multiple email addresses.

4. The method of claim 1, wherein the performing the action comprises sending a set of preferences for a user, on the email system, to a sender on another email system in communication with the email system of the user.

5. The method of claim 1, wherein the second email address is a preferred address of a user on the email system.

6. The method of claim 1, wherein the one of the first and second preferences comprises a classification of the email, and wherein the action depends on the classification.

7. The method of claim 1, wherein the one of the first and second preferences comprises performing a search of the email, and wherein the action depends on a result of the search of the email.

8. A system for managing routing of an email, the system comprising:
a processor, a computer readable memory and a computer readable storage device;
program instructions, stored on the computer readable storage device for execution by the processor via the computer readable memory, to analyze incoming and outgoing emails to ensure that routing of the incoming and outgoing emails occurs in conformity with a plurality of preferences set configured in an application in communication with an email system;
program instructions, stored on the computer readable storage device for execution by the processor via the computer readable memory, to receive the email in a server computer, the email including a first email address from multiple email addresses of an addressee of the email, wherein the email is deliverable to the addressee from the email system, and wherein each of the preferences comprises an action for routing emails to at least one of the multiple email addresses of the addressee;

program instructions, stored on the computer readable storage device for execution by the processor via the computer readable memory, to compare a part of the email to first and second preferences in the plurality of preferences, wherein the first preference comprises an email address of a sender of the email, and wherein the second preference comprises a regular expression to compare to a content of the email, wherein the content is distinct from the email address of the sender of the email;

program instructions, stored on the computer readable storage device for execution by the processor via the computer readable memory, to identify a match between the part of the email and one of the first and the second preferences;

program instructions, stored on the computer readable storage device for execution by the processor via the computer readable memory, to perform the action of the one of the first and the second preferences, wherein the program instructions to perform the action comprise program instructions to send the email to a second email address from the multiple email addresses, wherein the action of the first preference depends on the email address of the sender of the email, wherein the action of the second preference depends on the regular expression matching a portion of a content of the email, and wherein the second email address is different than the first email address; and program instructions, stored on the computer readable storage device for execution by the processor via the computer readable memory, to allow, over a verified connection, a second email system access to the application, wherein the email system and the second email system are operable to agree to use the application to analyze a second email sent to the addressee, wherein the email system and the second email system execute on separate data processing systems, and wherein the separate data processing systems are further distinct from the server computer.

9. The system of claim 8, wherein the application is a web service in communication with the email system and optionally another email system compatible with the email system.

10. The system of claim 8, further comprising program instructions, stored on the computer readable storage device for execution by the processor via the computer readable memory, to provide management instructions to a server computer of another email system in communication with the email system, wherein the management instructions permit invocation of instructions of the system on the server computer.

11. The system of claim 8, further comprising program instructions, stored on the computer readable storage device for execution by the processor via the computer readable memory, to notify a sender of the email of a preferred email address among the multiple email addresses.

12. The system of claim 8, wherein the program instructions to perform the action comprise program instructions to send a set of preferences for a user, on the email system, to a sender on another email system in communication with the email system.

13. The system of claim 8, wherein the second email address is a preferred address of a user on the email system.

14. A computer program product for managing routing of an email comprising:
a computer readable storage device;
program instructions, stored on the computer readable storage device, to analyze incoming and outgoing emails to ensure that routing of the incoming and outgoing emails occurs in conformity with a plurality of preferences set configured in an application in communication with an email system;

program instructions, stored on the computer readable storage device, to receive the email in a server computer, the email including a first email address from multiple email addresses of an addressee of the email, wherein the email is deliverable to the addressee from the email system, and wherein each of the preferences comprises an action for routing emails to at least one of the multiple email addresses of the addressee;

program instructions, stored on the computer readable storage device, to compare a part of the email to first and second preferences in the plurality of preferences, wherein the first preference comprises an email address of a sender of the email, and wherein the second preference comprises a regular expression to compare to a content of the email, wherein the content is distinct from the email address of the sender of the email;

program instructions, stored on the computer readable storage device, to identify a match between the part of the email and one of the first and the second preferences;

program instructions, stored on the computer readable storage device, to perform the action of the one of the first and the second preferences, wherein the program instructions to perform the action comprise program instructions to send the email to a second email address from the multiple email addresses, wherein the action of the first preference depends on the email address of the sender of the email, wherein the action of the second preference depends on the regular expression matching a portion of a content of the email, and wherein the second email address is different than the first email address; and program instructions, stored on the computer readable storage device, to allow, over a verified connection, a second email system access to the application, wherein the email system and the second email system are operable to agree to use the application to analyze a second email sent to the addressee, wherein the email system and the second email system execute on separate data processing systems, and wherein the separate data processing systems are further distinct from the server computer.

* * * * *